United States Patent

Sawada et al.

[11] Patent Number: 5,871,416
[45] Date of Patent: Feb. 16, 1999

[54] CONTROLLER AND CONTROL METHOD FOR CONTINUOUSLY VARIABLE TRANSMISSION

[75] Inventors: Makoto Sawada, Atsugi; Hirofumi Okahara, Isehara, both of Japan

[73] Assignee: Nissan Motor Co., Ltd., Kanagawa, Japan

[21] Appl. No.: 812,649

[22] Filed: Mar. 7, 1997

[30] Foreign Application Priority Data

Mar. 7, 1996 [JP] Japan .................................. 8-050386

[51] Int. Cl.[6] ................................................ B60K 41/12
[52] U.S. Cl. ............................................. 477/47; 477/48
[58] Field of Search ................................ 477/44, 45, 46, 477/47, 48

[56] References Cited

U.S. PATENT DOCUMENTS

| | | | |
|---|---|---|---|
| 4,708,031 | 11/1987 | Morimoto et al. | 477/49 |
| 4,823,267 | 4/1989 | Kumura | 477/47 |
| 5,199,399 | 4/1993 | Shibuya | 477/47 |
| 5,259,272 | 11/1993 | Yamamoto et al. | 477/45 |
| 5,642,644 | 7/1997 | Lardy et al. | 477/46 |

FOREIGN PATENT DOCUMENTS 61-105347  5/1986  Japan .

*Primary Examiner*—Charles A. Marmor
*Assistant Examiner*—Sherry Lynn Estremsky
*Attorney, Agent, or Firm*—McDermott, Will & Emery

[57] ABSTRACT

In a continuously variable transmission (CVT) for a vehicle wherein a belt of V-shaped cross-section is looped around a drive pulley and a driven pulley respectively having grooves of identical shape to this belt, and the width of the groove of each pulley is varied according to a supplied oil pressure, an oil pressure when an accelerator pedal is released is maintained at or above a predetermined value. The oil pressure is controlled according to a torque input to the drive pulley, and the input torque varies according a depression amount of the accelerator pedal. As a result, the speed change ratio easily varies due to insufficient oil pressure when the accelerator pedal is released. This invention stops decline of oil pressure when the accelerator is released, and thereby prevents variation of the speed change ratio due to release of the accelerator pedal. This is especially useful when the speed change ratio of the transmission has been fixed by the driver in a manual speed change mode.

12 Claims, 8 Drawing Sheets

CONTROLLER AND CONTROL METHOD FOR CONTINUOUSLY VARIABLE TRANSMISSION

FIELD OF THE INVENTION

This invention relates to hydraulic control of a continuously variable transmission.

BACKGROUND OF THE INVENTION

A continuously variable transmission (referred to hereafter as CVT) for a vehicle using a V-belt is for example disclosed in Tokkai Sho 61-105347 published by the Japanese patent office in 1986.

This CVT comprises a drive pulley and driven pulley around which the belt is looped. The widths of the grooves of the pulleys are varied according to the oil pressure, and the radius of the contact part of the V-belt and the pulley varies according to the groove width.

An oil pressure (line pressure) corresponding to the input torque to the drive pulley acts on the driven pulley, and an oil pressure (primary pressure) which is the line pressure adjusted by a control valve acts on the drive pulley. The contact friction between the belt and the pulleys is basically maintained by the line pressure.

In CVT speed change control, the controller computes a target speed change ratio based on the accelerator depression by the driver and the vehicle speed at that time, and the primary pressure is made to vary relative to the line pressure so that the real speed change ratio coincides with a target speed change ratio.

However, as the line pressure is set to a value depending on the torque as mentioned above, the line pressure decreases when the driver releases the accelerator pedal corresponding to the decrease of input torque, and the contact friction also decreases.

At this time, when the contact friction decreases, the contact radius between the driven pulley and the V-belt decreases while the contact radius between the drive pulley and the V-belt increases due to the centrifugal force which acts on the V-belt. As a result, the speed change ratio decreases, i.e. the speed tends to increase.

In the automatic speed change mode wherein the speed change ratio frequently varies according to the driving conditions, the driver does not experience discomfort even when a speed change occurs due to release of the accelerator pedal. However in the fixed speed change mode where the speed change ratio is fixed at a certain value by the driver, the driver does experience discomfort if the speed change ratio suddenly changes when the accelerator pedal is released.

SUMMARY OF THE INVENTION

It is therefore an object of this invention to regulate a change of speed change ratio when an accelerator pedal is released.

In order to achieve the above object, this invention provides a controller for a continuously variable transmission for a vehicle.

The transmission comprises a belt of V-shaped cross-section, and a drive pulley and driven pulley respectively having grooves of the same V-shaped cross-section as the belt. The belt is looping around the pulleys in the grooves. The transmission also comprises a mechanism for varying a width of the grooves according to a supplied oil pressure.

The controller comprises a mechanism for controlling the oil pressure according to a torque input to the drive pulley, a mechanism for detecting a release of an accelerator pedal of the vehicle, and a mechanism for preventing the oil pressure from falling below a predetermined pressure when the accelerator pedal has been released.

If the transmission further comprises a mechanism for selecting a manual speed change mode wherein a speed change ratio between the drive pulley and driven pulley is fixed at a predetermined ratio, it is preferable that the controller further comprises a mechanism for prohibiting the preventing mechanism from performing prevention in a certain mode different form the manual speed change mode.

The transmission may further comprises a mechanism for selecting one of automatic speed change modes. These automatic speed change modes provide an automatically varying speed change ratio between the drive pulley and driven pulley according to a running condition of the vehicle and comprise a specific automatic speed change mode which has a minimum speed change ratio larger than a minimum speed change ratio of another automatic speed change mode. In this case, it is further preferable that the specific speed change mode is excluded from the aforesaid certain mode.

It is also preferable that the controller further comprises a mechanism for detecting a speed change ratio between the drive pulley and driven pulley, a mechanism for detecting a rotation speed of the drive pulley, and a mechanism for setting the predetermined pressure according to the speed change ratio and the rotation speed.

In this case, it is further preferable that the setting mechanism sets the predetermined pressure higher the larger the speed change ratio, and sets the predetermined pressure higher the more the rotation speed increases.

It is also preferable that the controller further comprises a mechanism for detecting a rotation speed of the drive pulley and a mechanism for prohibiting the preventing mechanism from performing prevention when the rotation speed does not reach a predetermined rotation speed.

In this case, it is further preferable that the predetermined rotation speed is set based on the rotation speed of the drive pulley when a speed change ratio between the drive pulley and driven pulley begins to decrease due to the centrifugal force of the V-belt when the oil pressure decreases.

This invention also provides a method of controlling such a continuously variable transmission for a vehicle that comprises a belt which has a V-shaped cross-section looped around a drive pulley and driven pulley which have grooves of the same V-shaped cross-section as the belt, and a mechanism for varying a width of a groove of the pulleys via oil pressure according to a torque input to the drive pulley from an engine of the vehicle.

The method comprises the steps of controlling the oil pressure according to a torque input to the drive pulley, determining whether or not an accelerator pedal of the vehicle has been released, and preventing the oil pressure from falling below a predetermined pressure when the accelerator pedal has been released.

If the transmission further comprises a mechanism for applying a manual speed change mode wherein a speed change ratio between the drive pulley and driven pulley is fixed at a predetermined ratio, it is preferable that the method further comprises a step of prohibiting the preventing step from performing prevention in a certain mode different from the manual speed change mode.

The transmission may further comprises a mechanism for selecting one of automatic speed change modes. These automatic speed change modes provide an automatically varying speed change ratio between the drive pulley and driven pulley according to a running condition of the vehicle and comprise a specific automatic speed change mode which has a minimum speed change ratio larger than a minimum speed change ratio of another automatic speed change mode. In this case, it is further preferable that the specific speed change mode is excluded from the aforesaid certain mode.

It is also preferable that the predetermined pressure is set according to a speed change ratio between the drive pulley and driven pulley, and the rotation speed of the drive pulley.

In this case, it is further preferable that the predetermined pressure is set higher as the speed change ratio increases, and set higher the larger the rotation speed.

It is also preferable that the method further comprises a step of prohibiting the preventing step from performing prevention when a rotation speed of the drive pulley does not reach a predetermined rotation speed.

In this case, it is further preferable that the predetermined rotation speed is set based on the rotation speed of the drive pulley when a speed change ratio between the drive pulley and driven pulley begins to decrease due to the centrifugal force of the belt when the oil pressure decreases.

The details as well as other features and advantages of this invention are set forth in the remainder of the specification and are shown in the accompanying drawings.

DESCRIPTION OF THE PREFERRED EMBODIMENTS

Figure 1:
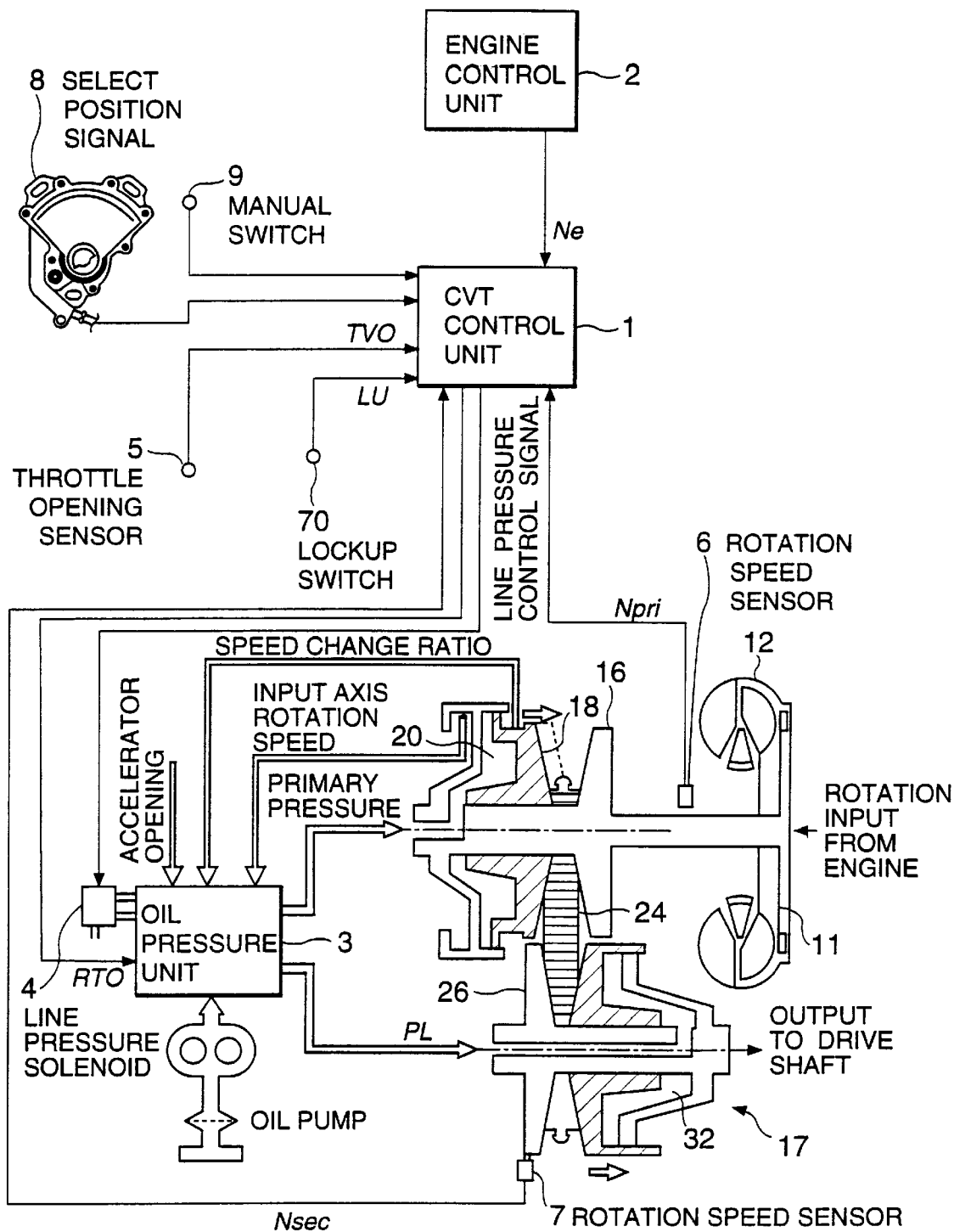
FIG. 1 is a schematic diagram of a speed change controller according to this invention.

Referring to FIG. 1 of the drawings, a vehicle CVT 17 is provided with a drive pulley 16 connected to an engine, not shown, and a driven pulley 26 connected to a drive shaft. These are both variable pulleys, and are connected by the V-belt 24.

The CVT 17 comprises a torque converter 12 having a lockup clutch 11.

Figure 2:
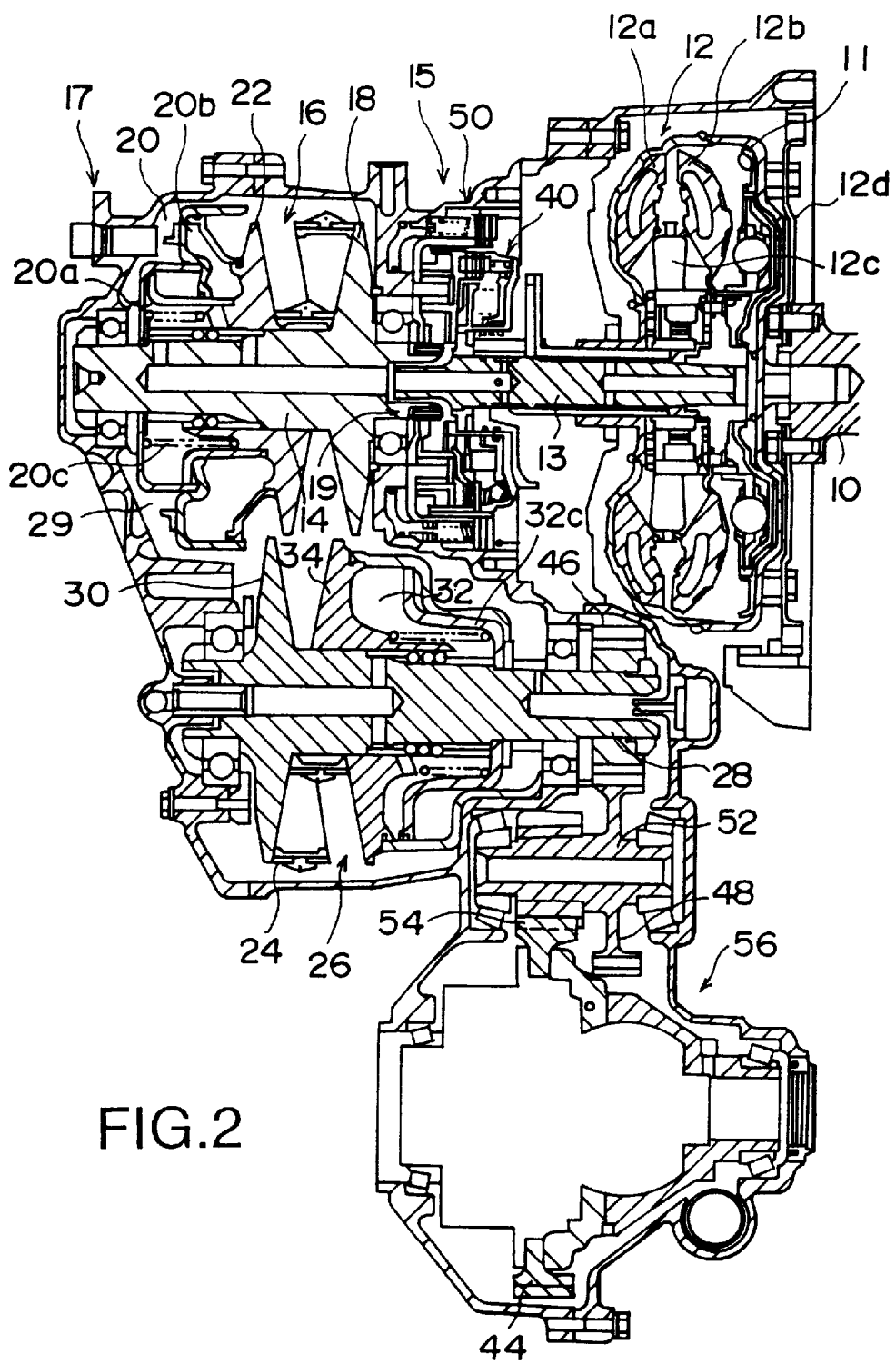
FIG. 2 is a vertical sectional view of a CVT to which this invention is applied.

As shown in FIG. 2, the lockup clutch 11 mechanically connects or disconnects an impeller 12a which is an input part and a turbine 12b which is an output part according to the oil pressure supplied to a converter chamber 12c and a lockup oil chamber 12d.

The turbine 12b is connected to a rotation shaft 13, the rotation shaft 13 being connected to a forward/reverse change-over mechanism 15. The mechanism 15 comprises a planetary gear mechanism 19, forward clutch 40 and reverse brake 50. The output shaft of the mechanism 19 is connected to a drive shaft 14 formed coaxially with the rotation shaft 13. The drive shaft 14 comprises the input shaft of a continuously variable transmission (CVT) 17. It should be noted that a fluid coupling or an electromagnetic clutch may be used instead of the torque converter 12.

The CVT 17 comprises a drive pulley 16 and driven pulley 26, and a V-belt 24 which transmits the rotation of-the drive pulley 16 to the driven pulley 26, as described hereinabove.

The drive pulley 16 comprises a fixed conical plate 18 which rotates together with the drive shaft 14 and a movable conical plate 22 disposed relative to the fixed conical plate 18 forming a V-shaped pulley groove with the fixed conical plate 18. The movable conical plate 22 moves in the axial direction of the drive shaft 14 according to an oil pressure acting on a drive pulley cylinder chamber 20 while it rotates with the fixed conical plate 18. The drive pulley cylinder chamber 20 comprises a chamber 20a and chamber 20b. The movable conical plate 22 has a pressure receiving surface larger that of a movable conical plate 34 described hereinafter.

The driven pulley 26 is installed on a driven shaft 28. The driven pulley 26 comprises a fixed conical plate 30 which rotates together with the driven shaft 28 and a movable conical plate 34 disposed relative to the fixed conical plate 30 forming a V-shaped pulley groove with the fixed conical plate 30. The movable conical plate 34 moves in the axial direction of the driven shaft 28 according to an oil pressure acting on a driven pulley cylinder chamber 32 while it rotates with the fixed conical plated 30.

The driven pulley 28 is provided with a drive gear 46 which rotates together with the pulley 28. The drive gear 46 engages with an idler gear 48 on an idler shaft 52. The idler shaft 52 comprises a pinion gear 54 which rotates together with the shaft 52. The pinion gear 54 engages with a final gear 44. The final gear 44 drives a propeller shaft or drive shaft, not shown, via a differential unit 56.

The rotation input to the CVT 17 from the engine output shaft 10 is transmitted to the forward/reverse change-over mechanism 15 via the torque converter 12 and rotation shaft 13. When the forward clutch 40 is engaged and the reverse brake 50 is released, the rotation of the rotation shaft 13 is transmitted to the drive shaft 14 of the CVT 17 with the same rotation direction via the planetary gear mechanism 19 whereof the input shaft and output shaft rotate together. On the other hand, when the forward clutch 40 is released and the reverse brake 50 is engaged, the rotation of the rotation shaft 13 is transmitted to the drive shaft 14 with the opposite rotation direction due to the action of the planetary gear mechanism 19.

The rotation of the drive shaft 14 is transmitted to the differential unit 56 drive pulley 16, V-belt 24, driven pulley 26, driven shaft 28, drive gear 46, idler gear 48, idler shaft 52, pinion gear 54 and final gear 44. When the forward clutch 40 and reverse brake 50 are both released, the forward/reverse change-over mechanism 15 goes into neutral, and transmission of a rotation from the rotation shaft 13 to the drive shaft 14 does not occur.

In the aforesaid dynamic transmission, the rotation ratio, i.e. speed change ratio (deceleration ratio) between the drive pulley 16 and driven pulley 26 varies when the movable conical plate 22 of the drive pulley 16 and movable conical plate 34 of the driven pulley 26 are moved in axial direction so as to alter the contact point radius with the V-belt 24. For example, if the width of the V-shaped pulley groove of the drive pulley 16 is enlarged and the width of the V-shaped pulley groove of the driven pulley 26 is narrowed, the contact point radius of the V-belt 24 on the side of the drive pulley 16 decreases and the contact point radius of the V-belt 24 on the side of the driven pulley 24 increases, so a large deceleration ratio is obtained. When the movable conical plates 22, 34 are moved in the opposite direction, the deceleration ratio becomes smaller.

This control of the widths of the V-shaped pulley grooves of the drive pulley 16 and driven pulley 26 is performed by controlling the relative pressures of the drive pulley cylinder chamber 20 (20a, 20b) and driven pulley cylinder chamber 32.

The pressure in the drive pulley cylinder chambers 20 (20a, 20b) and driven pulley cylinder chamber 32 is controlled by line pressure control which controls the basic pressure supplied to the cylinder chambers 20, 32 and primary control which controls the pressure in the drive pulley chamber 20 relative to the line pressure so as to vary the speed change ratio of the CVT 17.

Figure 3:
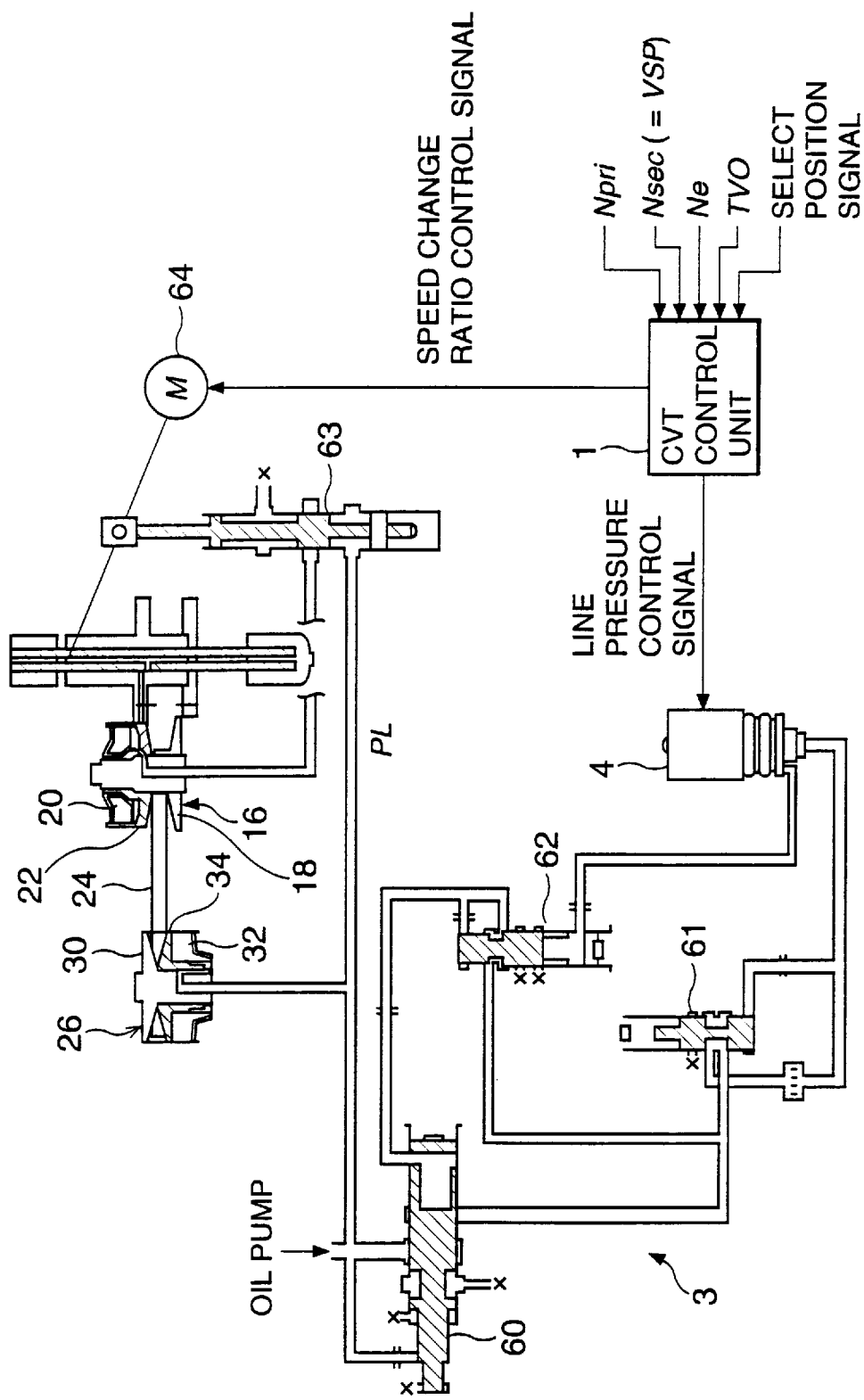
FIG. 3 is a schematic diagram of an oil pressure valve unit provided in the CVT.

Line pressure control is performed by an oil pressure unit 3, and more specifically, via a line pressure solenoid 4 shown in FIG. 3.

The line pressure solenoid 4 is duty controlled by the CVT control unit 1. The line pressure solenoid 4 sets a line pressure PL to a value commanded by the CVT control unit 1 by driving a line pressure regulator 60 via a pilot valve 61 and pressure modifier 62.

A step motor 64 drives a speed change control valve 63 according to a command from the CVT control unit 1, and achieves the speed change ratio RTO specified by the CVT control unit 1 by adjusting the oil pressure of the cylinder pressure chamber 20 of the drive pulley 16.

Signals from a rotation speed sensor 6 which detects the rotation speed Npri of the drive pulley 16 and a rotation speed sensor 7 which detects the rotation speed Nsec of the driven pulley 26 are input to the CVT control unit 1. Also input are a select position signal of a shift lever, not shown, which is detected by the inhibitor switch 8, a signal from a manual switch 9, a lockup signal L U from a lockup switch 70 which detects lockup of the torque converter 12, and a throttle opening signal TVO from the throttle opening sensor 5. A sensor which detects the accelerator depression by the driver may be used instead of the throttle opening sensor 5.

The shift lever has functions for selecting a D range where normal automatic speed change is performed, a Ds range where the speed change characteristics are set so that the engine rotation speed increases more for the same vehicle speed, an L range where the speed change characteristics are set so that the speed change ratio becomes even larger, an R range for reversing, a P range for parking and an N range for the neutral position. The inhibitor switch 8 detects which of these ranges is selected.

In addition to the above automatic speed change mode, the shift lever also allows selection of a manual operating mode (M range) where the speed change ratio is fixed at a value depending on a driver operation. In the manual operating mode, the shift lever has a function for commanding shift-down or shift-up in order to specify the speed change ratio, these commands being detected by the aforesaid manual switch 9.

In addition to the aforesaid sensor signals, the CVT control unit 1 also reads the engine rotation speed Ne from the engine control unit 2 which controls fuel injection amount and ignition timing in the engine. The speed change ratio RTO and contact frictional force of the V-belt 24 are controlled according to the driving state of the vehicle shown by this read data, and according to the driver's needs.

Figure 4:
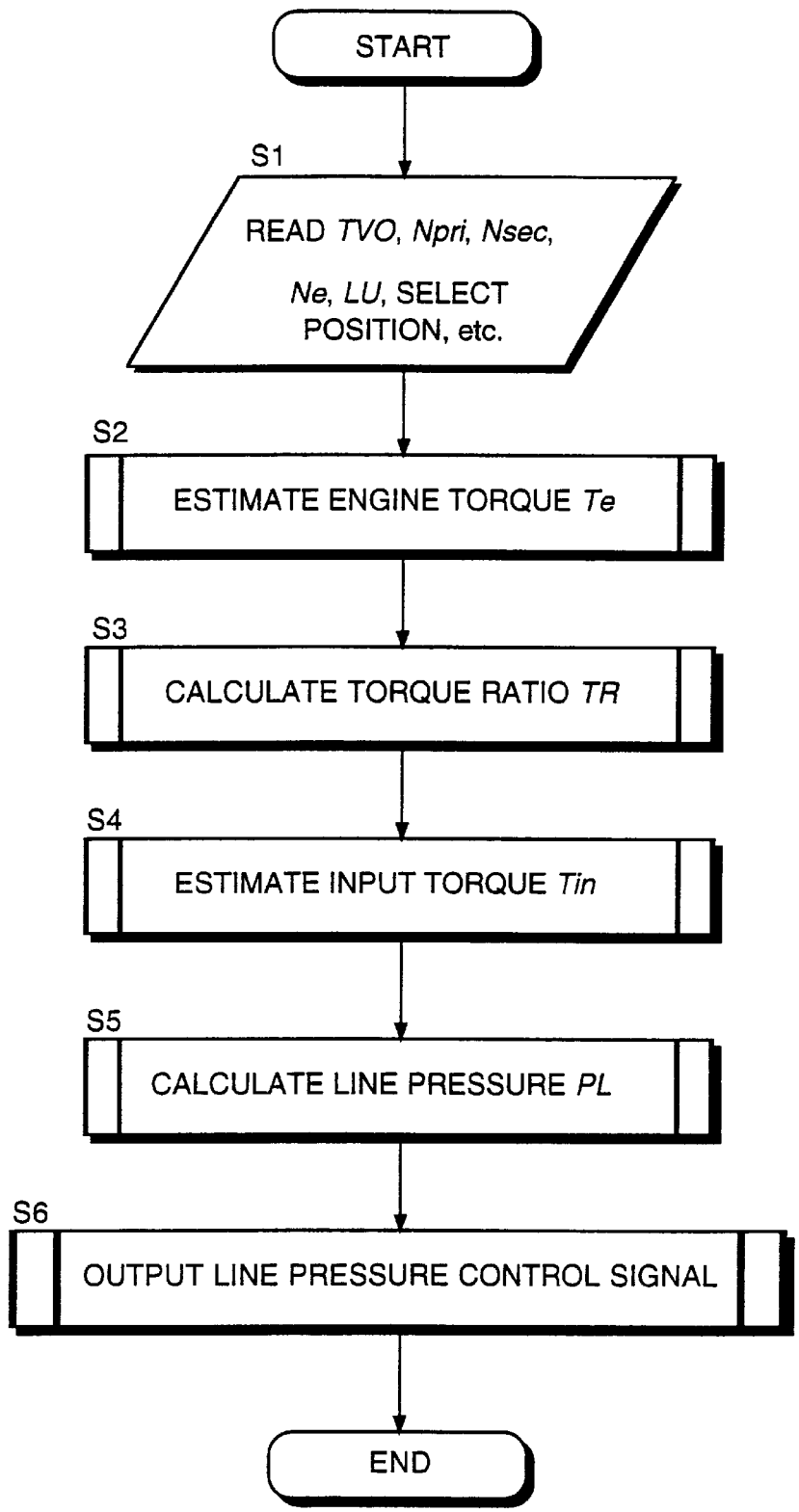
FIG. 4 is a flowchart showing a line pressure control process performed by the speed change controller.
Figure 5:
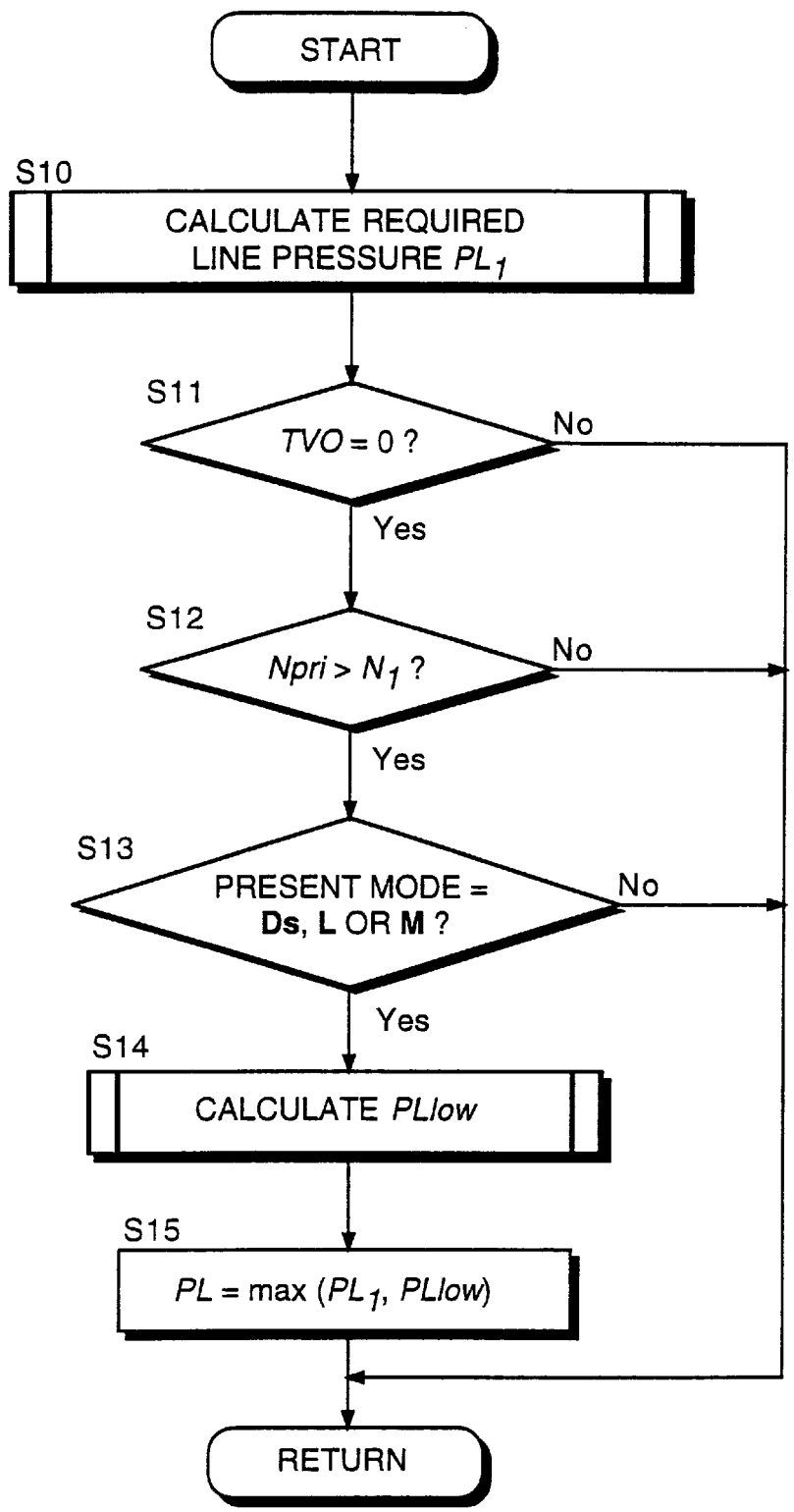
FIG. 5 is a flowchart showing a line pressure computation process performed by the speed change controller.

Next, the line pressure control performed by the CVT control unit 1 will be described in more detail referring to the flowcharts of FIGS. 4 and 5 and the block diagram of FIG. 6. FIG. 4 shows the main routine of the line pressure control, and FIG. 5 shows a subroutine of the line pressure computing process.

In a step S1, the rotation speed (primary rotation speed) Npri of the drive pulley 16 and the rotation speed (secondary rotation speed) Nsec of the driven pulley 26 from the CVT 17, the throttle opening TVO, and signals from the inhibitor switch 8 and manual switch 9 are read. The engine rotation speed Ne is also read from the engine control unit 2.

In the step S2, an engine torque Te is found from a preset map according to the throttle opening TVO and the engine rotation speed Ne. This map is set according to the engine rotation speed Ne with the throttle opening TVO as a parameter as shown by a function F3 in FIG. 6.

Further, as the torque converter 12 is interposed between the engine and the CVT 17, a torque ratio TR of the torque converter 12 is computed in a step S3.

Figure 6:
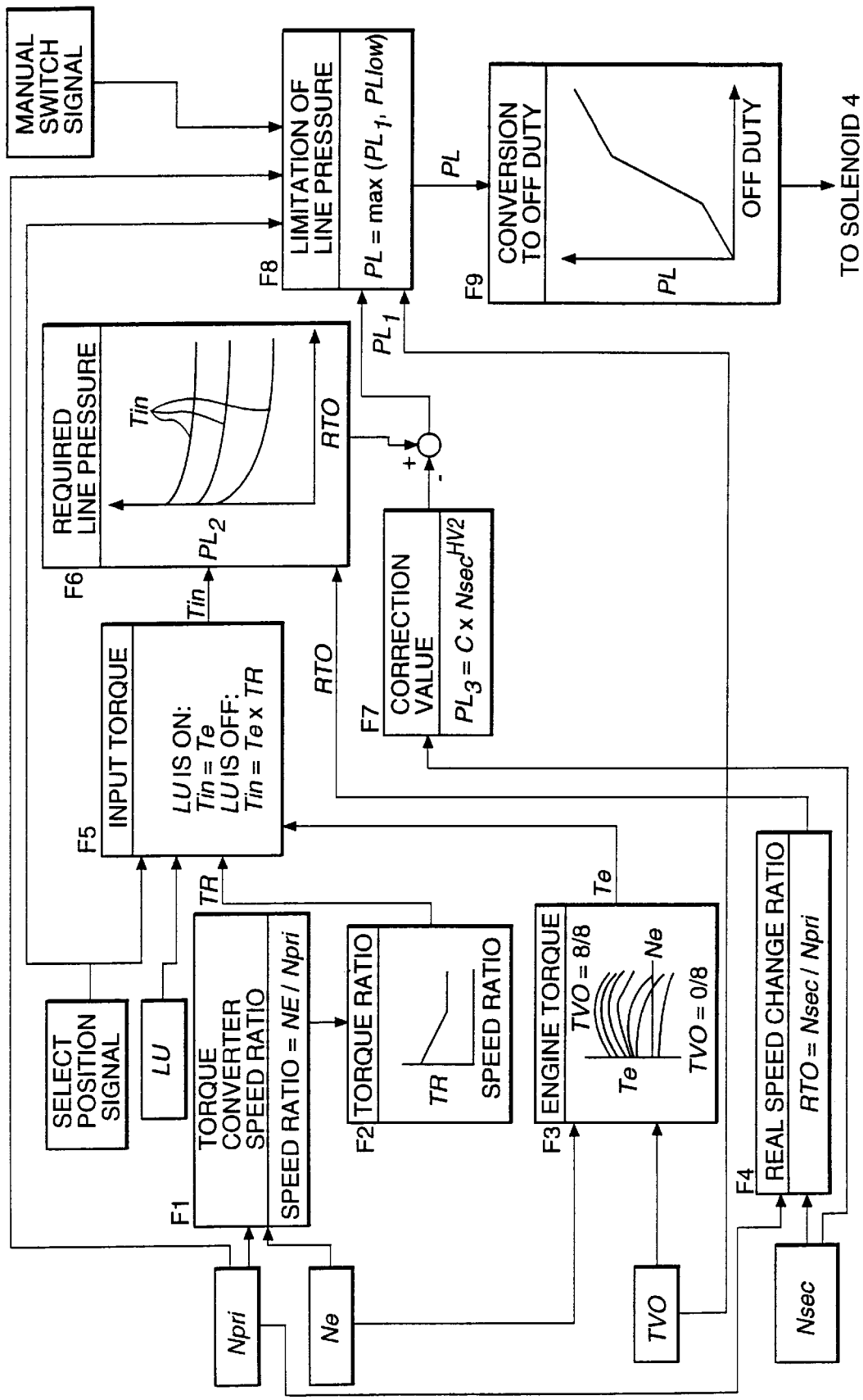
FIG. 6 is a block diagram describing line pressure control functions provided by the speed change controller.

As shown by the function F1 of FIG. 6, this torque ratio TR is computed according to the speed ratio Ne/Npri of the engine rotation speed Ne and the speed Npri of the drive pulley 16 from a map shown in the function F3. In a step S4, an estimated torque Tin input to the CVT 17 is calculated based on an engine torque estimated value Te, the torque ratio TR and the lockup signal LU of the torque converter 12.

The method of performing this computation is different depending on the lockup signal LU as shown by the function F5 of FIG. 6. Specifically, when the lockup signal LU is ON and the lockup clutch 11 is engaged, the estimated input torque Tin is:

Tin=Te

When the lockup signal LU is OFF and the lockup clutch 11 is not engaged, the estimated input torque Tin is:

Tin=Te×TR

In a step S5, a line pressure PL to be provided for maintaining contact friction between the drive pulley 16, driven pulley 26 and V-belt 24 is computed according to the working state of the lockup clutch 11 with the estimated input torque Tin as a parameter.

The computation of this line pressure PL is performed by a subroutine shown in FIG. 5. In this subroutine, as shown by a function F6 in FIG. 6, a required line pressure $PL_2$ is first found in a step S10 from a map according to the speed change ratio RTO with the estimated input torque Tin as a parameter. In this process, the required speed change ratio RTO is found by the following equation in a function F4.

$$RTO = \frac{N\sec}{Npri}$$

Herein, the pressure acting on the driven pulley cylinder chamber 32 is actually different from the line pressure due to the centrifugal force resulting from the rotation of the driven pulley 26. This corrected value is calculated from the function F7 of FIG. 6. A modified line pressure $PL_1$, is then found by correcting the required line pressure $PL_2$ obtained in the function F6 using a correction value $PL_3$ obtained in the function F7. The aforesaid calculations are performed in the step S10. In steps Si1–S13, it is determined whether or not the present driving conditions correspond to predetermined driving conditions when the accelerator pedal is released in the manual operating mode.

First, in the step S11, it is determined whether the throttle opening is 0, i.e. whether the accelerator pedal has been released.

When TVO=0, the routine proceeds to a step S12, and it is determined whether or not the rotation speed Npri of the drive pulley 16 is larger than a predetermined value $N_1$.

The predetermined value $N_1$ is set at a speed where the speed change ratio RTO begins to decrease due to the centrifugal force of the V-belt 24 when the line pressure PL decreases.

Figure 8:
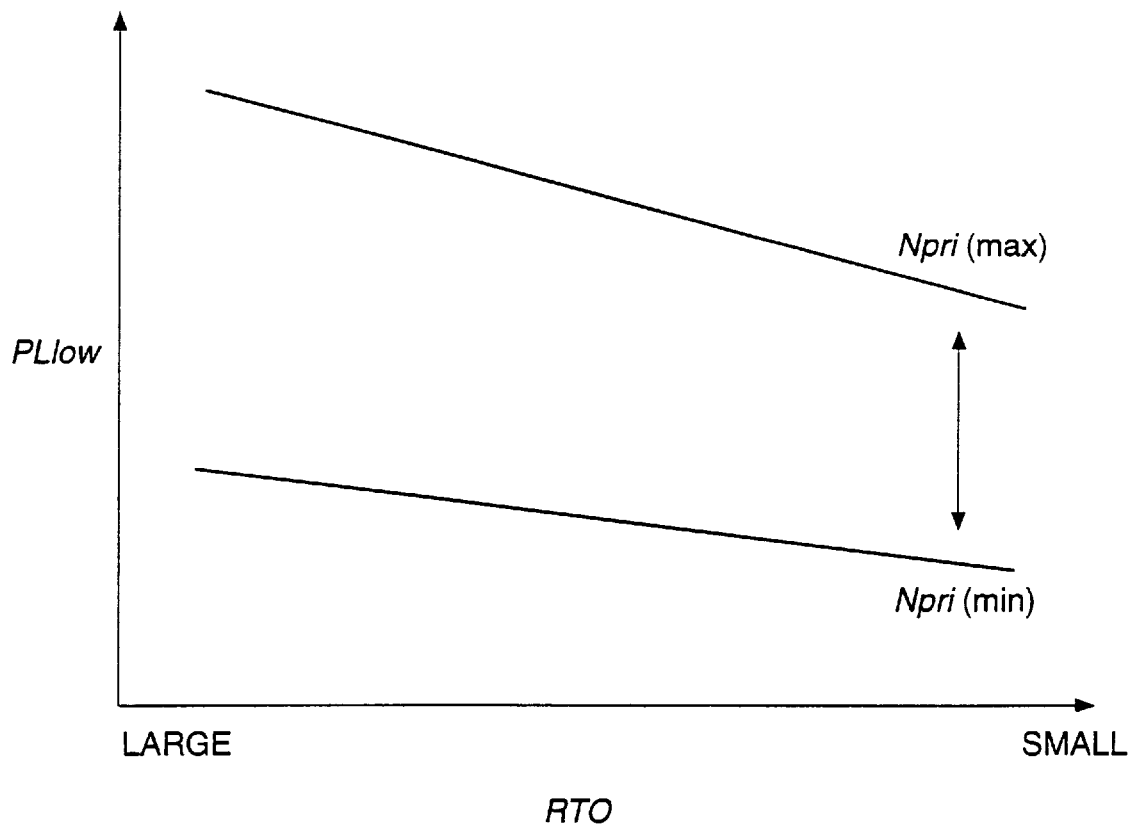
FIG. 8 is a map specifying a relation between a speed change ratio RTO, line pressure PL and drive pulley rotation speed Npri used by the speed change controller.

In the step S13, it is determined from the signals from the inhibitor switch 8 and manual switch 9 whether the present speed change mode corresponds to the M range, Ds range or L range. When it corresponds to any of these ranges, the minimum value PLlow of the line pressure PL is computed in a step S14. This computation involves looking up a map of minimum line pressures PLlow set according to the speed change ratio RTO with the primary rotation speed Npri as a parameter, as shown in FIG. 8.

In this map, the minimum line pressure PLlow is set larger as the speed change ratio RTO increases, and the minimum line pressure PLlow is also set to increase according to increase of the primary rotation speed Npri. In the map, minimum line pressures PLlow are set respectively for a maximum value Npri(max) and minimum value Npri(min) of the drive pulley rotation speed Npri, and the minimum line pressure PLlow is computed by performing an interpolation according to the input primary rotation speed Npri.

In a step S15, the larger of the required line pressure $PL_1$ found in the step S10 and the aforesaid minimum line pressure PLlow is set to the control line pressure PL. This corresponds to a function F8 of FIG. 6.

Therefore when for example the accelerator pedal is released in the manual operating mode and the primary rotation speed Npri exceeds a predetermined value, the minimum value of the line pressure PL is limited by PLlow. On the other hand in driving states other than the M range, L range and Ds range, the required line pressure $PL_1$ found in the step S10 is the control line pressure PL.

After setting the control line pressure PL, the control process returns to the main routine of FIG. 4. Then, in a step S6 and function F9 of FIG. 6, a duty ratio is calculated according to the control line pressure PL, and the line pressure solenoid 4 is controlled by a signal output corresponding to the duty ratio.

The main routine comprising the above steps S1–S6 is executed at a predetermined time interval. Therefore when for example the accelerator pedal is released in the manual operating mode (M range) and the drive pulley rotation speed Npri exceeds a predetermined value, the line pressure PL is maintained at a value equal to or greater than a predetermined minimum line pressure PLlow. This helps to prevent the V-belt 24 from shifting the speed change ratio to lower values due to decrease of the line pressure PL of the variable pulleys sandwiching the V-belt 24.

As this minimum line pressure PLlow is set to increase as the speed change ratio RTO increases, unexpected shifts of the speed change ratio in the manual operating mode are suppressed for all speed change ratios.

Also, shift of the line pressure due to release of the accelerator pedal can also be prevented in the Ds range and L range. Hence even when the accelerator pedal is released as the vehicle turns a corner, for example, the line pressure PL is maintained at or above the minimum line pressure PLlow, and the speed change ratio RTO is maintained at a level desired by the driver.

Figure 7:
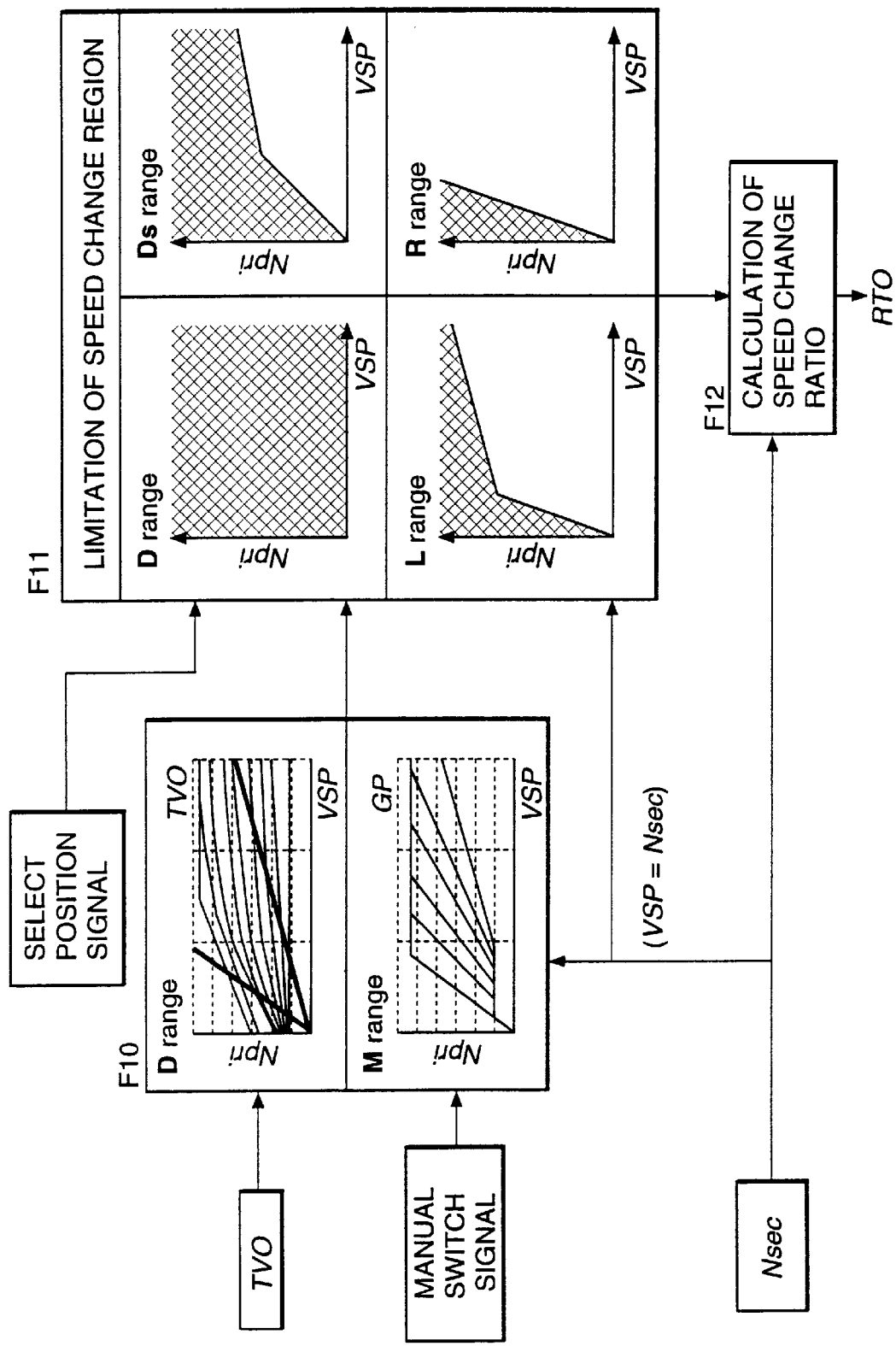
FIG. 7 is a block diagram describing speed change ratio control functions provided by the speed change controller.

The aforesaid is a description of line pressure control, but the CVT control unit 1 also controls the primary pressure via the step motor 64 and the speed change control valve 63 of the oil pressure valve unit 3. This is based on a target value of the speed change ratio RTO computed in functions F10–F12 of FIG. 7.

Describing this briefly, the target value of the primary rotation speed Npri is first computed in F10. In the automatic speed change mode, this value is found from a map set according to the throttle opening TVO and vehicle speed VSP. As the vehicle speed VSP, the primary rotation speed Nsec is used. In the manual speed change mode, the target value of the primary rotation speed Npri is found from a map according to the speed change ratio GP determined by commands via the manual switch 9 and the vehicle speed VSP.

In the function F11, in all ranges of the automatic speed change mode except the D range, e.g. the Ds range, L range or R range, the target value of the primary rotation speed Npri is limited by a map set for each range.

In the function F12, a target value of the speed change ratio RTO is computed from the target value of the Npri so determined and the secondary rotation speed Nsec. The CVT control unit 1 thereby achieves a target speed change ratio by controlling the step motor 64 and speed change control valve 63 based on this target speed change ratio.

The embodiments of this invention in which an exclusive property or privilege is claimed are defined as follows:

We claim:

1. A controller for a continuously variable transmission for a vehicle, said transmission comprising a belt of V-shaped cross-section, a drive pulley and driven pulley respectively having grooves of the same V-shaped cross-section as said belt, said belt looping around said pulleys in said grooves, means for varying a width of said grooves according to a supplied oil pressure, and means for selecting a manual speed change mode wherein a speed change ratio between said drive pulley and driven pulley is fixed at a predetermined ratio, said controller comprising:

means for controlling said oil pressure according to a torque input to said drive pulley, means for detecting a release of an accelerator pedal of the vehicle, means for preventing said oil pressure from falling below a predetermined pressure when said accelerator pedal has been released, and means for prohibiting said preventing means from performing prevention when a certain mode different from said manual speed change mode is selected.

2. A controller as defined in claim 1, wherein said transmission further comprises means for selecting one of automatic speed change modes, said automatic speed change modes providing an automatically varying speed change ratio between said drive pulley and driven pulley according to a running condition of the vehicle and comprising a specific automatic speed change mode which has a minimum speed change ratio larger than a minimum speed change ratio of another automatic speed change mode, and wherein said specific speed change mode is excluded from said certain mode.

3. A controller, for a continuously variable transmission for a vehicle, said transmission comprising a belt of V-shaped cross-section, a drive pulley and driven pulley respectively having grooves of the same V-shaped cross-section as said belt, said belt looping around said pulleys in said grooves, and means for varying a width of said grooves according to a supplied oil pressure, said controller comprising:

means for controlling said oil pressure according to a torque input to said drive pulley, means for detecting a release of an accelerator pedal of the vehicle, means for detecting a speed change ratio between said drive pulley and driven pulley, means for detecting a rotation speed of said drive pulley, means for setting a predetermined pressure according to said speed change ratio and said rotation speed, and means for preventing said oil pressure from falling below the predetermined pressure when said accelerator pedal has been released.

4. A controller as defined in claim 3, wherein said setting means sets said predetermined pressure higher the larger said speed change ratio, and sets said predetermined pressure higher the more said rotation speed increases.

5. A controller for continuously variable transmission for a vehicle, said transmission comprising a belt of V-shaped cross-section, a drive pulley and driven pulley respectively having grooves of the same V-shaped cross-section as said belt, said belt looping around said pulleys in said grooves, and means for varying a width of said grooves according to a supplied oil pressure, said controller comprising:

means for controlling said oil pressure according to a torque input to said drive pulley, means for detecting a release of an accelerator pedal of the vehicle, means for preventing said oil pressure from falling below a predetermined pressure when said accelerator pedal has been released, means for detecting a rotation speed of said drive pulley, and means for prohibiting said preventing means from performing prevention when said rotation speed does not reach a predetermined rotation speed.

6. A controller as defined in claim 5, wherein said predetermined rotation speed is set based on the rotation speed of said drive pulley when a speed change ratio between said drive pulley and driven pulley begins to decrease due to the centrifugal force of the V-belt when said oil pressure decreases.

7. A method of controlling a continuously variable transmission for a vehicle, said transmission comprising a belt which has a V-shaped cross-section looped around a drive pulley and driven pulley which have grooves of the same V-shaped cross-section as said belt, means for varying a width of a groove of said pulleys via oil pressure according to a torque input to said drive pulley from an engine of the vehicle, and means for applying a manual speed change mode wherein the speed change ratio between said drive pulley and driven pulley is fixed at a predetermined ratio, said method comprising the steps of:

controlling said oil pressure according to a torque input to said drive pulley, determining whether or not an accelerator pedal of said vehicle has been released, preventing said oil pressure from falling below a predetermined pressure when the accelerator pedal has been released, and prohibiting said preventing step from performing prevention in a certain mode different from said manual speed change mode.

8. A control method as defined in claim 7, wherein said transmission further comprises means for selecting one of automatic speed change modes, said automatic speed change modes providing an automatically varying speed change ratio between said drive pulley and driven pulley according to a running condition of the vehicle and comprising a specific automatic speed change mode which has a minimum speed change ratio larger than a minimum speed change ratio of another automatic speed change mode, and wherein said specific speed change mode is excluded from said certain mode.

9. A method of controlling a continuously variable transmission for a vehicle, said transmission comprising a belt which has a V-shaped cross-section looped around a drive Pulley and driven pulley which have grooves of the same V-shaped cross-section as said belt, and means for varying a width of a groove of said pulleys via oil pressure according to a torque input to said drive pulley from an engine of the vehicle, said method comprising the steps of:

controlling said oil pressure according to a torque input to said drive pulley, determining whether or not an accelerator pedal of said vehicle has been released, detecting a speed change ratio between said drive pulley and driven pulley, detecting a rotation speed of said drive pulley, setting a predetermined pressure according to said speed change ratio between said drive pulley and driven pulley, and the rotation speed of said driven pulley and preventing said oil pressure from falling below said predetermined pressure when the accelerator pedal has been released.

10. A control method as defined in claim 9, wherein said predetermined pressure is set higher as said speed change ratio increases, and set higher the larger said rotation speed.

11. A method of controlling a continuously variable transmission for a vehicle, said transmission comprising a belt which has a V-shaped cross-section looped around a drive pulley and driven pulley which have grooves of the same V-shaped cross-section as said belt, and means for varying a width of a groove of said pulleys via oil pressure according to a torque input to said drive pulley from an engine of the vehicle, said method comprising the steps of:

controlling said oil pressure according to a torque input to said drive pulley, determining whether or not an accelerator pedal of said vehicle has been released, preventing said oil pressure from falling below a predetermined pressure when the accelerator pedal has been released, detecting a rotation speed of said drive pulley, and prohibiting said preventing step from performing prevention when said rotation speed of said driven pulley does not reach a predetermined rotation speed.

12. A control method as defined in claim 11, wherein said predetermined rotation speed is set based on the rotation speed of said drive pulley when a speed change ratio between said drive pulley and driven pulley begins to decrease due to the centrifugal force of the V-belt when said oil pressure decreases.

\* \* \* \* \*